United States Patent [19]

Zaccaria

[11] Patent Number: 4,861,530

[45] Date of Patent: Aug. 29, 1989

[54] METHOD FOR ENABLING THE CUTTING TO SIZE OF A CONTINUOUSLY EXTRUDED WEATHER STRIP WITH VARIABLE CHARACTERISTICS, PARTICULARLY FOR MOTOR VEHICLE BODIES

[75] Inventor: Manrico Zaccaria, Cirié, Italy

[73] Assignee: S.A.I.A.G. S.p.A., Cirie, Italy

[21] Appl. No.: 201,979

[22] Filed: Jun. 3, 1988

[30] Foreign Application Priority Data

Jun. 5, 1987 [IT] Italy ............................... 67483 A/87

[51] Int. Cl.⁴ ..................... B29C 47/02; B29C 47/92
[52] U.S. Cl. .................................. 264/40.2; 264/149; 264/167; 264/172; 264/177.2; 425/142
[58] Field of Search ..................... 264/40.2, 149, 167, 264/172, 177.1, 177.2; 425/142; 49/462, 490, 491, 497; 52/208, 716; 428/122, 188, 358

[56] References Cited

U.S. PATENT DOCUMENTS

| 4,576,773 | 3/1986 | Azzola et al. | 264/167 |
| 4,584,150 | 4/1986 | Ballocca | 264/40.2 X |
| 4,753,765 | 6/1988 | Pande | 264/149 |
| 4,765,936 | 8/1988 | Ballocca | 264/167 X |

FOREIGN PATENT DOCUMENTS

| 54-4956 | 1/1979 | Japan | 264/177.1 |
| 59-2824 | 1/1984 | Japan | 264/167 |
| 59-78837 | 5/1984 | Japan | 264/167 |

Primary Examiner—Jeffery Thurlow
Assistant Examiner—Leo B. Tentoni
Attorney, Agent, or Firm—Sughrue, Mion, Zinn, Macpeak & Seas

[57] ABSTRACT

A method for enabling the cutting to size of a continuous extruded weather strip including an anchoring profile provided with internal longitudinal retaining ribs and a tubular sealing profile co-extruded with the retaining profile and having variable characteristics. In order to cut the weather strip in predetermined zones related to the variations in the characteristics of the weather strip during extrusion, at least one of the internal longitudinal ribs is at least partially omitted in sections spaced from each other according to the length of the pieces of extrusion to be cut to size, and the omitted sections are detected to provide corresponding signals to enable cutting.

2 Claims, 1 Drawing Sheet

METHOD FOR ENABLING THE CUTTING TO SIZE OF A CONTINUOUSLY EXTRUDED WEATHER STRIP WITH VARIABLE CHARACTERISTICS, PARTICULARLY FOR MOTOR VEHICLE BODIES

BACKGROUND OF THE INVENTION

The present invention relates in general to the production of extruded weather strips. More specifically, the invention concerns a weather strip intended particularly for fitting to the edge of an aperture or closure element of the body of a motor vehicle, of the type comprising a U-sectioned anchoring profile of elastomeric material provided with internal longitudinal ribs for retaining the weather strip on the edge, and a tubular sealing profile also of elastomeric material and co-extruded with the retaining profile, and in which the tubular profile and/or the anchoring profile have variable characteristics.

These variable characteristics may consist, for example, of a differentiated section of the wall of the tubular profile, a variable configuration of the anchoring profile, or even of variations in the shape or relative positioning thereof.

In the production of such weather strips, there is the problem of cutting the continuously extruded element to size in order to obtain pieces of a length which is predetermined in dependence on the fitting requirements. The cutting zones are normally coordinated with the variations in the characteristics of the extrusion. The cutting must be effected automatically, in synchronisation with the advance of the weather strip output by the extrusion head and with maximum precision, that is, exactly in correspondence with the predetermined zones. However, since the speed of advance of the extrusion may be subject to variations during extrusion, control of the cutting action cannot be directly related to this advance. It is therefore necessary to provide references on the extruded weather strip for detection by suitable sensors for controlling the cutting.

According to current techniques used by the Applicant, such references are constituted by additional parts in the form of appendages or projections formed on the weather strip directly during extrusion, in correspondence with the predetermined cutting zones, and cooperating, for example, with mechanical detectors operatively associated with the cutting unit.

This solution involves considerable complications in the weather strip extrusion process, as well as additional costs due to the need to use auxiliary equipment for obtaining the reference projection and for compensating for pressure differences which are generated according to whether the additional part is present or not in a section of the extrusion. Moreover, this projection remains on the finished weather strip and is then visible from outside, with obvious aesthetic disadvantages when the weather strip is in the mounted condition. To avoid the latter problem, it is necessary to remove the reference projection after the weather strip has been cut, which involves further production tasks.

SUMMARY OF THE INVENTION

The object of the present invention is to avoid the above problems, by means of a method adapted to enable the precise cutting to size of. extruded weather strips with variable characteristics of the type defined at the beginning, which enables the use of projections or similar reference elements visible from outside, or intended subsequently to be removed from the weather strip, to be avoided.

The method according to the invention is characterised in that it consists of the at least partial omission during extrusion of the weather strip, of at least one of the internal longitudinal retaining ribs of the anchoring profile of the weather strip in sections which can be related to the predetermined cutting zones, and of the detection of the omitted sections and the provision of corresponding signals to enable cutting.

The elimination of short portions of one or more of the internal ribs of the anchoring profile may be achieved by providing the extrusion head with simple devices for temporarily interrupting the flow of material destined to form the retaining rib or ribs from which the omission is to be effected. This interruption occurs for very short periods and the omitted sections are therefore of a size which has a negligible effect on the functioning of the ribs. In other words, the efficiency of the anchorage of the profile of the weather strip is not impaired and the aesthetic aspect of the weather strip is likewise unaltered, eliminating the need for further supplementary operations after cutting.

According to the invention, the detection of the omitted sections of the rib or ribs and the generation of the relative signals for enabling cutting are preferably performed by means of an optical transducer.

BRIEF DESCRIPTION OF THE DRAWINGS

The invention will now be described in detail with reference to the appended drawings provided purely by way of non-limiting example, in which.

DETAILED DESCRIPTION OF THE INVENTION

Figure 1:
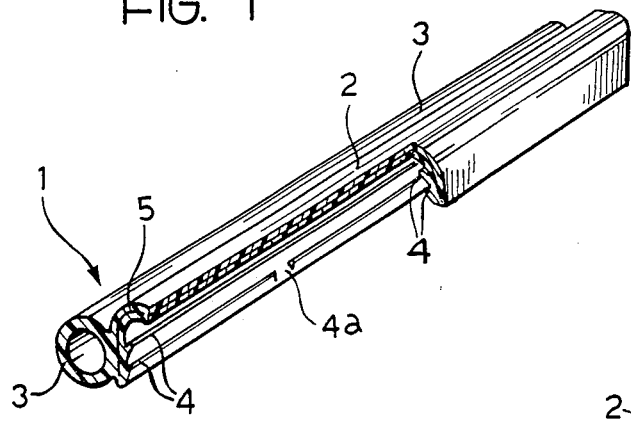
FIG. 1 is a schematic perspective view of a section of extruded weather strip to which the method according to the invention is applicable.
Figure 2:
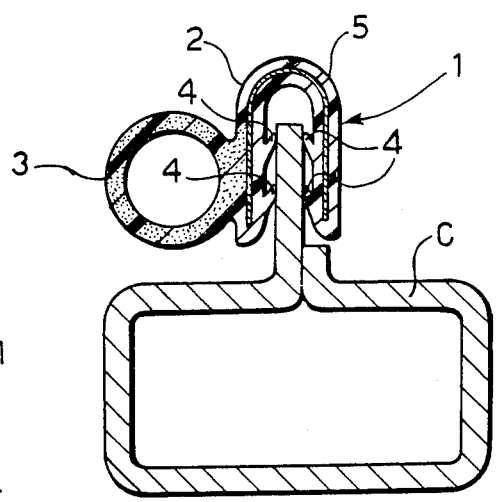
FIG. 2 is a cross-section of the weather strip in the fitted condition of use.

Referring initially to FIGS. 1 and 2, a weather strip produced by means of continuous extrusion is generally indicated 1 and is intended, in particular, to be fitted to the edge of an aperture or closure element of a motor vehicle body. The weather strip 1 comprises a U-sectioned anchoring profile 2 of elastomeric material, to which is connected a sealing profile 3 co-extruded with the anchoring profile 2 and made, for example, of a cellular elastomeric material. The anchoring profile 2 has longitudinal retaining ribs 4 on the internal surfaces of the U for enabling the weather strip to be fitted to the edge of an aperture or closure element and for preventing its detachment. The anchoring profile 2 is usually provided with a stiffening core, normally metallic, indicated 5.

FIG. 2 shows the weather strip in cross-section and fitted to a closure element C (for example, a door) of a motor car body.

The weather strip 1 normally has variable characteristics produced directly during extrusion. These variable characteristics may consist, for example, of a longitudinally differentiated piece of the wall of the tubular sealing profile 3, of a different shape of the line of connection between the tubular profile 3 and the anchoring profile 2, of a differentiated configuration of the latter, or even of variations in the shape or dimensions of one or both of the profiles 2 and 3.

As stated above, the weather strip 1 is produced continuously by means of an extrusion head and must then be cut to size transversely, so as to obtain pieces of predetermined length in dependence on the fitting requirements. Clearly, the cutting must be carried out very precisely, independently of the speed of advance of the weather strip 1 at the output of the extrusion head, since this speed may be subject to variations. Moreover, the cutting is normally carried out in correspondence with predetermined zones related to the variations in the characteristics of the weather strip.

According to the invention, these cutting zones are identified by means of references constituted by interruptions in one or more of the internal longitudinal retaining ribs 4 of the anchoring profile 2, spaced from each other by a distance equal to the length of the pieces of the profile to be cut to size.

Figure 3:
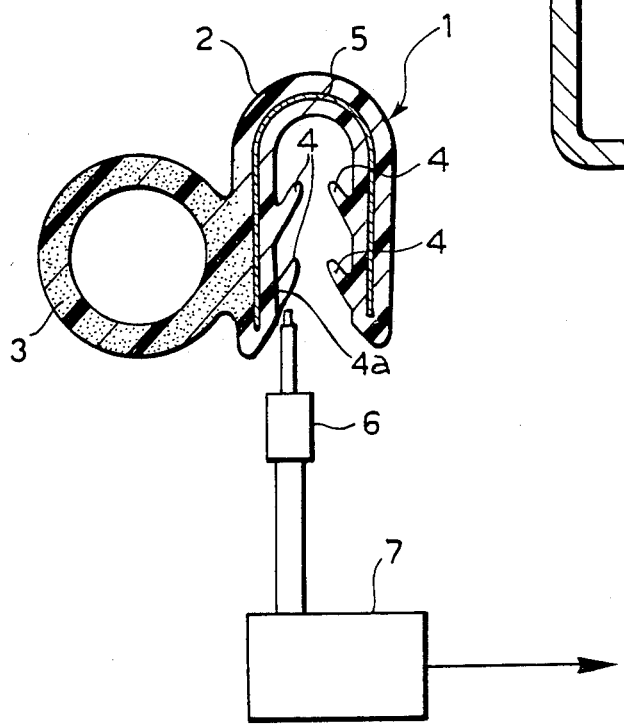
FIG. 3 is a view similar to FIG. 2 which shows schematically the weather strip during execution of the method according to the invention.

With reference to FIG. 3, in the case of the example illustrated, short sections 4a of one of the ribs 4 adjacent the longitudinal edges of the profile 2 are omitted in correspondence with the predetermined cutting zones during the extrusion stage of the weather strip 1. This omission is obtained simply by the periodic interruption of the supply through the extrusion head of the elastomeric material destined to form the rib 4. The omitted sections 4a are detected downstream of the extrusion plant, during advance of the weather strip 1, by means of an optical transducer 6 facing the path of movement of the rib 4 in which the interruptions 4a are made. The optical transducer 6 may, for example, be constituted by the end of a double fibre optic receiver/transmitter with "reflex" operation. The electrical signals generated by the transducer 6 in correspondence with the omitted sections 4a of the rib 4 are sent to an electronic control unit 7 through which the equipment for cutting the weather strip is controlled by means of devices known to an expert in the art.

It should be noted that the optical transducer 6 could be replaced by a different but functionally equivalent detection device, such as, for example, a mechanical or electromechanical feeler.

It will be clear that the method according to the invention uses simply and economically produced references which, in particular, are situated inside the weather strip 1 and are thus invisible from outside in the fitted condition of use shown in FIG. 2. In this way, aesthetic alterations of the weather strip 1 are avoided without, however, any risk of prejudicing the functional characteristics of the weather strip. In fact, the removal of short sections 4a of one or more of the internal ribs 4 does not' alter the anchoring characteristics of the profile 2 relative to the support structure C.

What is claimed is:

1. A method for enabling the cutting to size of a continuously extruded weather strip intended particularly for fitting to an edge of an aperture or closure element of a motor vehicle body, comprising a U-sectioned retaining profile of elastomeric material provided with internal longitudinal ribs for retaining the weather strip on the edge, and a tubular sealing profile also of elastomeric material and co-extruded with the retaining profile, in which the tubular profile and/or the anchoring profile have variable characteristics and in which the cutting must be carried out in correspondence with predetermined zones related to the variations in the characteristics of the weather strip, the method consisting of at least partial omission, during extrusion of the weather strip, of at least one of the internal longitudinal retaining rib in sections which can be related to predetermined cutting zones, detection of the omitted sections and provision of corresponding signals to enable cutting.

2. A method according to claim 1, wherein the omitted sections are detected by means of an optical transducer.

* * * * *